United States Patent

Bowser et al.

(10) Patent No.: US 7,583,703 B2
(45) Date of Patent: Sep. 1, 2009

(54) SYSTEM AND METHOD FOR POWER INJECTION AND OUT OF BAND COMMUNICATIONS ON SHARED MEDIUM

(75) Inventors: Robert Bowser, Copley, OH (US); Steven Cloud, Stow, OH (US); Chad Jones, Akron, OH (US)

(73) Assignee: Cisco Technology Inc., San Jose, CA (US)

( * ) Notice: Subject to any disclaimer, the term of this patent is extended or adjusted under 35 U.S.C. 154(b) by 872 days.

(21) Appl. No.: 10/692,380

(22) Filed: Oct. 23, 2003

(65) Prior Publication Data

US 2005/0097369 A1  May 5, 2005

(51) Int. Cl.
 *H04H 20/28*  (2008.01)
 *H04L 12/28*  (2006.01)
 *G06F 15/173*  (2006.01)

(52) U.S. Cl. ............... 370/487; 370/228; 370/254; 370/352; 370/410; 370/449; 709/223; 709/224; 375/257; 375/259

(58) Field of Classification Search ......... 370/532, 370/540, 252–503; 375/257, 259; 709/220–224; 379/322, 413, 395.01
See application file for complete search history.

(56) References Cited

U.S. PATENT DOCUMENTS

| | | | | |
|---|---|---|---|---|
| 5,754,764 A * | 5/1998 | Davis et al. | .................. | 709/200 |
| 5,994,998 A * | 11/1999 | Fisher et al. | ................ | 375/258 |
| 6,104,732 A * | 8/2000 | Pearman | ..................... | 370/541 |
| 6,130,894 A * | 10/2000 | Ojard et al. | .................. | 370/421 |
| 6,137,793 A * | 10/2000 | Gorman et al. | ............. | 370/360 |
| 6,266,350 B1 * | 7/2001 | Ojard et al. | .................. | 370/526 |
| 6,404,861 B1 * | 6/2002 | Cohen et al. | ............. | 379/93.01 |
| 6,449,348 B1 * | 9/2002 | Lamb et al. | ............. | 379/93.36 |
| 6,452,923 B1 * | 9/2002 | Gerszberg et al. | ........... | 370/352 |
| 6,510,152 B1 * | 1/2003 | Gerszberg et al. | ........... | 370/352 |
| 6,535,983 B1 | 3/2003 | McCormack et al. | | |
| 6,546,494 B1 | 4/2003 | Jackson et al. | | |
| 6,571,181 B1 * | 5/2003 | Rakshani et al. | .............. | 702/60 |
| 6,608,264 B1 | 8/2003 | Fouladpour | | |
| 6,681,248 B1 * | 1/2004 | Sears et al. | ................. | 709/223 |
| 6,952,785 B1 * | 10/2005 | Diab et al. | ................... | 713/300 |
| 7,447,428 B2 * | 11/2008 | Wang et al. | ................... | 398/2 |
| 2002/0071395 A1 * | 6/2002 | Redi et al. | .................. | 370/252 |
| 2003/0068033 A1 * | 4/2003 | Kiko | ......................... | 379/413 |
| 2003/0194912 A1 | 10/2003 | Ferentz | | |
| 2003/0200473 A1 * | 10/2003 | Fung | ......................... | 713/320 |
| 2004/0164619 A1 * | 8/2004 | Parker et al. | ................ | 307/80 |

OTHER PUBLICATIONS

Int'l Search Report for Int'l Application No. PCT/US2004/032005, mailed Jan. 11, 2005.
Aruba Wireless LAN Switching Datasheet, Aruba Wireless Networks, ver. 072104, 2003.

* cited by examiner

*Primary Examiner*—Ayaz R Sheikh
*Assistant Examiner*—Venkatesh Haliyur
(74) *Attorney, Agent, or Firm*—Tucker Ellis & West LLP

(57) ABSTRACT

In one embodiment, in a power injection and out of band communications on a shared medium system, the system is configured to receive a power signal. Concurrently, the system is configured to receive a data signal. The system is configured to transfer the power and data signals simultaneously on a shared medium.

15 Claims, 5 Drawing Sheets

SYSTEM AND METHOD FOR POWER INJECTION AND OUT OF BAND COMMUNICATIONS ON SHARED MEDIUM

BACKGROUND

Networks, such as local area network (LAN) architectures frequently require the transmission of power, data and control signals to remotely located devices such as voice over internet protocol (VoIP) telephones or wireless local area network (WLAN) devices. Traditionally, in order to supply power along with the transmitted data signals, LAN architectures required multiple wired connections to the remote devices. For example, WLAN devices were able to communicate Ethernet data signals via category three (CAT-3) or category five (CAT-5) twisted pair wire and to receive power from a second cable connected to a power source, such as a wall socket or a battery. Additional cabling was necessary for communication of management and control signals.

Earlier systems implemented a practice of applying power to a remote 10/100 Base T Ethernet based device over unused pairs of conductors in a 10/100 Base T Ethernet cable. The present system extends the scope of earlier implementations by adding out of band communications to the unused pairs to manage and control the remote device. Specifically, the present system extends the described power over Ethernet scheme by modulating a serial bit-stream over the same unused pairs in a fashion that is compatible and interoperable with existing power over Ethernet schemes. This process solves the problem of requiring multiple connections to a remote device for power, primary network connection and console interface.

Eliminating the need for separate power, data and control wiring simplifies the installation and management of network devices, such as VoIP telephones or wireless access points, and can reduce the cost of installation. Therefore, it is desirable to transmit management and control signals over the same cabling that currently provides power and network connectivity while only requiring the integrity of the physical layer.

SUMMARY OF ILLUSTRATED EMBODIMENTS

The present system and method provides for adding out of band communications to the unused pairs of network cable to manage and control a remote device. Specifically, the present system and method contemplate modulating a serial bit-stream control signal over the unused pair in a fashion that is compatible and interoperable with existing power over Ethernet schemes.

In accordance with one embodiment, the present method includes receiving a power and data signal from a power and data input respectively. Additionally, a discovery signal may be received from a network device. The discovery signal may provide the system an acknowledgment of the presence of a network device capable of receiving power via the network.

Once the discovery signal has been sent and then returned power is applied to the remote device. At that point, the system and method may be suitably configured to concurrently transfer the power and data signals via a shared medium to the network device. Of course, the data signal may be modulated using existing means in a manner interoperable with the power signal.

Another embodiment includes receiving a second data signal for the purpose out of band communications. The system may be further configured to concurrently transfer the second data signal with the power and data signal via a shared medium.

In yet another embodiment, the system may be configured to receive the second data signal in the form of an Ethernet signal. The system may be suitably configured to convert the second Ethernet data signal into a serial bit-stream data signal. In accordance with an embodiment, the second data signal may be concurrently transferred with the power and data signals via a shared medium to the network device.

BRIEF DESCRIPTION OF THE DRAWINGS

It will be appreciated that the illustrated boundaries of elements (e.g. boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa.

DETAILED DESCRIPTION OF ILLUSTRATED EMBODIMENTS

Figure 1:
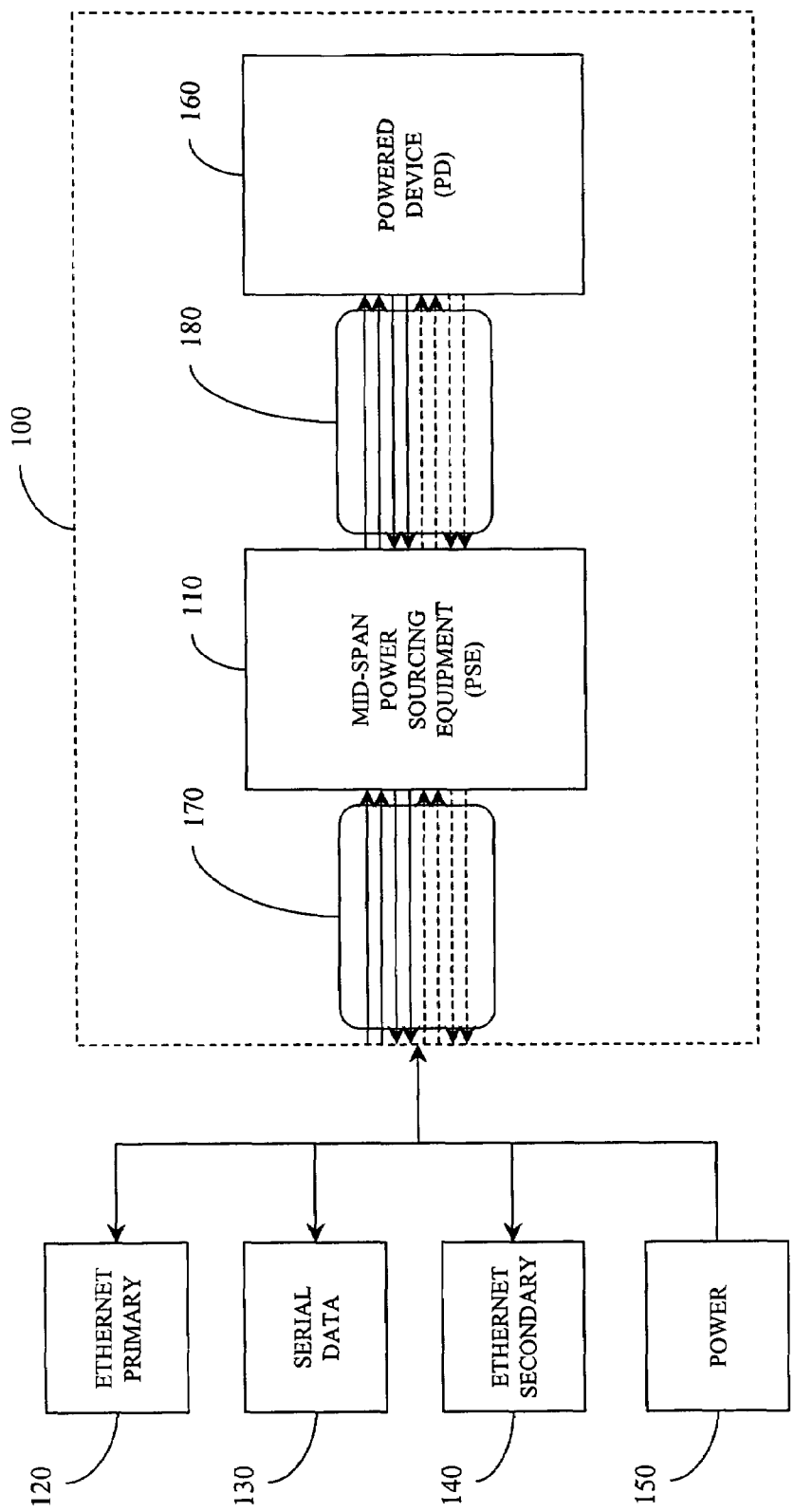
FIG. 1 is a block system diagram of one embodiment of the present system illustrating power, data and control signal flow through components of the system.

The following includes definitions of selected terms used throughout the disclosure. The definitions include examples of various embodiments and/or forms of components that fall within the scope of a term and that may be used for implementation. Of course, the examples are not intended to be limiting and other embodiments may be implemented. Both singular and plural forms of all terms fall within each meaning:

"Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like. Logic may also be fully embodied as software.

"Signal", as used herein, includes but is not limited to one or more electrical signals, analog or digital signals, one or more computer or processor instructions, messages, a bit or bit stream, or other means that can be received, transmitted, and/or detected.

"Software", as used herein, includes but is not limited to one or more computer readable and/or executable instructions that cause a computer or other electronic device to perform functions, actions, and/or behave in a desired manner. The instructions may be embodied in various forms such as objects, routines, algorithms, modules or programs including separate applications or code from dynamically linked libraries. Software may also be implemented in various forms such as a stand-alone program, a function call, a servlet, an applet, instructions stored in a memory, part of an operating system, or other type of executable instructions. It will be appreciated by one of ordinary skill in the art that the form of software may be dependent on, for example, requirements of a desired application, the environment it runs on, and/or the desires of a designer/programmer or the like.

"Unused pairs" of conductor, as used herein, refers to the pairs of conductor located within a multi-conductor cable that are traditionally not used to transmit primary network traffic.

"User", as used herein, includes but is not limited to one or more persons, software, computers or other devices, or combinations of these.

"Used pairs" of conductor, as used herein, refers to the pairs of conductor located within a multi-conductor cable that are traditionally used to transmit primary network traffic.

The following includes examples of various embodiments and/or forms of components that fall within the scope of the present system that may be used for implementation. Of course, the examples are not intended to be limiting and other embodiments are suitably implemented.

Briefly describing one embodiment of the present system, it provides for a network system configured to concurrently transmit power, data and control signals to remotely located network devices over a shared medium or common conductor. For example, one embodiment introduces the concept of transmitting out of band control and management signaling via the unused pairs of a 10/100 Base T Ethernet connection to control and manage a remotely located network device concurrent with the transmission of power signals. Furthermore, the system is advantageously configured to transmit the out of band signaling along with the power signals in a common cable concurrent with the primary data and network communications.

In other words, the system is suitably configured to utilize the used conductors within the 10/100 Base T Ethernet connection for transmission of primary data and network communications. Additionally, the system is suitably configured to concurrently transmit power and control signaling on the unused pairs of conductor with the cable.

It will be appreciated that the network is suitably any type of computer network known in the art. For example, the network may be a local area network (LAN), a wide area network (WAN) or an asynchronous transfer mode (ATM) network or the like. For exemplary purposes, the embodiments described herein will be described based upon an Ethernet-based LAN architecture.

In the following embodiments, the system is described to be configured utilizing a network port configured to accept a standard Registered Jack45 or RJ-45 connector with an eight-wire twisted pair cable. It will be appreciated that alternative ports, connectors and/or cabling are suitably utilized without departing from the scope of the present system. Although the embodiment contemplates utilizing the RJ-45 connector, an artisan would appreciate that other connectors known in the art could be implemented without departing from the scope of the invention.

Illustrated in FIG. 1 is a simplified system component diagram of one embodiment of the present system 100. The system components shown in FIG. 1 generally represent the system 100 and suitably employ any desired configuration included within any system architecture.

One embodiment of the present system is directed to a system and method configured to concurrently supply power, data and control signals to remotely located network devices over a standard Ethernet eight conductor twisted-pair cable. For example, the connection of a remotely located network device is suitably accomplished utilizing a single 10/100 Base T Ethernet connection.

In an embodiment, primary network traffic is advantageously transmitted over used pairs of conductor while power, serial control and discovery signaling is suitably and concurrently transmitted over the unused pairs within the eight wire conductor. While the present embodiment describes the concurrent transmission of power, data and control signals, it will be appreciated that the transmission of any combination of these signals may be accomplished without departing from the scope of the present system. For example, in the event that the remotely located device is incapable of accepting power via the network, the system may suitably transmit primary network traffic concurrent with serial control and management signals.

In FIG. 1, an embodiment of the present system 100 is illustrated. Generally, the system 100 includes a mid-span Power Sourcing Equipment (PSE) 110 configured to transmit Ethernet primary communications 120 together with out of band serial data 130, Ethernet secondary communications 140 and direct current (DC) power 150 to a remotely located Powered Device (PD) 160 via Ethernet cables 170, 180. The PD 160 may be configured to receive signals from the PSE 110 and is capable of communicating with the PSE 110. For example, the PD 160 is suitably configured to communicate with the PSE 110 to acknowledge the ability to accept power via the network thus prompting the PSE 110 to send DC power 150 via the network.

It will be appreciated that the ability for the out of band signaling to communicate does not depend on the status of the Ethernet link. In other words, the out of band signaling is configured to communicate so long as the unused pairs are intact and connected.

Although FIG. 1 illustrates the PSE 110 implemented as a mid-span device located between the sections of conductor 170, 180. It will be appreciated that the present system is implemented with the PSE 110 as an endpoint PSE and may take the form of a power injector design block that is suitably a standalone device. Further, it will be appreciated that the PSE 110 is advantageously integrated into additional network equipment such as a switched hub (not shown) or the corresponding support circuitry of the PD 160.

In an embodiment, the system is advantageously configured to modulate the serial data 130 concurrent with DC power 150. Additionally, a separate 10/100 Base T Ethernet connection (e.g. Ethernet Secondary 140) is suitably used to provide a second channel for control and management of the network device.

The serial data signals 130 suitably include management and control signals received via a standard serial connection port such as an RS-232 interface. Similarly, the Ethernet secondary signals 140 are suitably management and control signals transmitted via the Ethernet connection. Of course, an artisan will appreciate that the Ethernet connection advantageously affords greater cable connection length than the standard serial port connection.

Figure 2:
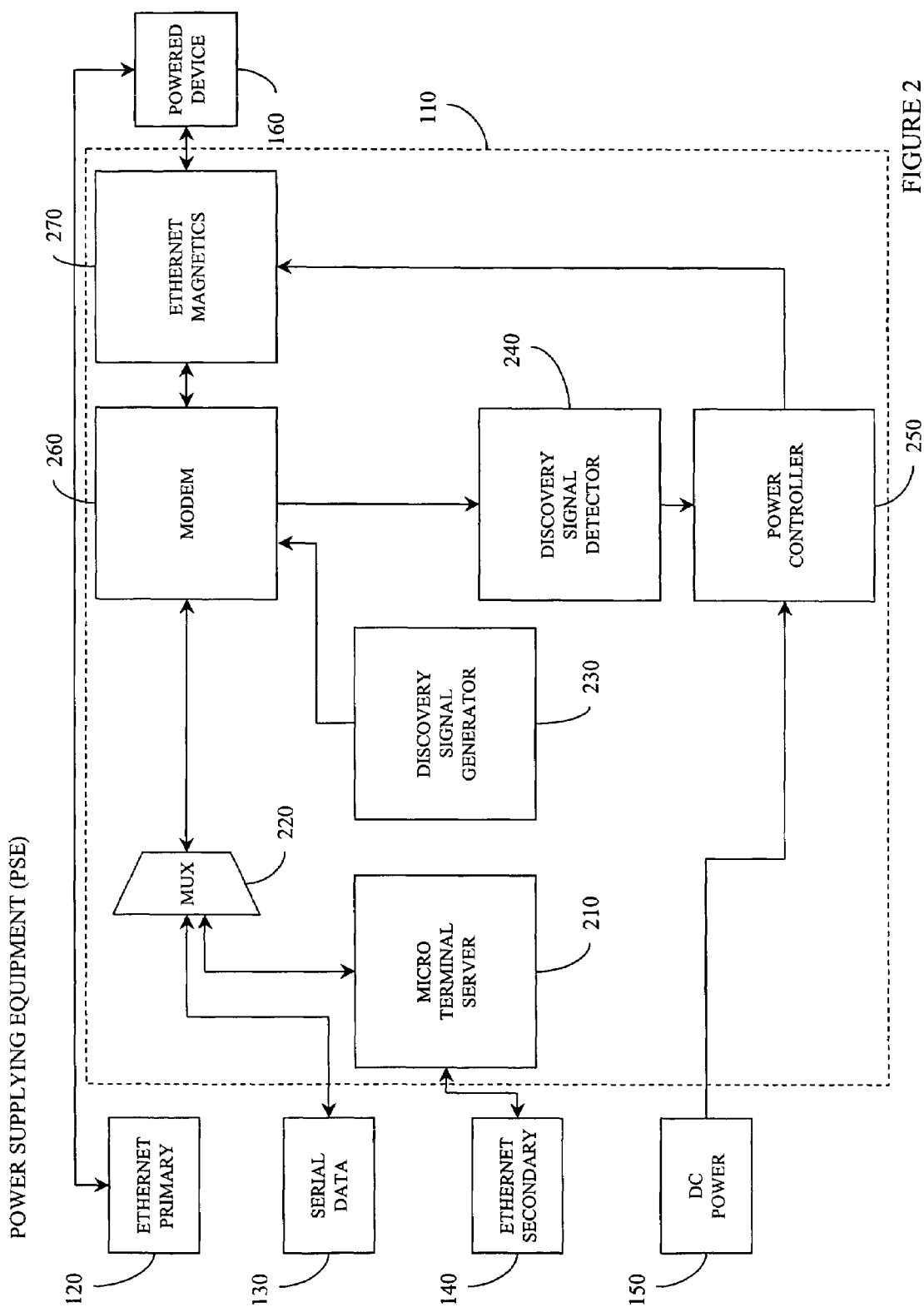
FIG. 2 is a block component diagram of one embodiment of the power supplying equipment (PSE) in accordance with the present system illustrating power and data signal flow through the PSE.

The operation and directional flow of power and data signals will be better understood with reference to FIG. 2 which illustrates an example of power and signal flow through the PSE 110. Illustrated in FIG. 2 is a simplified system component diagram of one embodiment of the PSE 110.

As shown in FIG. 2, an embodiment of the PSE circuit block 110 may suitably include a micro terminal server 210 configured to convert signals from Ethernet to serial bit-stream data and a serial data multiplexer or mux 220 configured to combine multiple signals for transmission. Additionally, a discovery signal generator 230 and a discovery signal detector 240 are advantageously provided and configured to perform the determination of presence of remote device. As well, a power controller 250 configured to regulate and transmit power, a modem 260 configured to modulate and demodulate discovery signals for transmission and Ethernet magnetics 270 are advantageously provided. The system components shown in FIG. 2 generally represent the PSE 110 and may have any desired configuration without departing from the scope of the present system.

In an embodiment, the system is configured to perform a discovery process initiated by the PSE 110 generating a fixed frequency signal and applying the signal to the unused-transmit pair. During the condition that the PD 160 is not receiving power, the fixed frequency applied to the unused-transmit pair is looped back onto the unused-receive pair. As the PSE 110 receives the looped-back signal, the PD 160 is considered to be discovered and the PSE 110 applies a direct current (DC) voltage across the unused pairs. The discovery mode is maintained throughout the duration of applying power to the unused pairs.

In operation and as illustrated in FIG. 2, the Ethernet primary communications signals 120 may be transmitted to the PD 160 via the used pairs of conductor exclusive of the PSE 110. Alternatively, it will be appreciated that the Ethernet primary communication signals 120 are suitably passed through the PSE 110 to the PD 160. For example, the Ethernet primary communication signals 120 may be passed through the mux 220 of the PSE 110 in the same manner as described below with reference to the Ethernet secondary signals 140.

Concurrent with the transmission of the Ethernet primary signals 120, the PSE 110 circuit block may be configured to utilize the unused pairs of conductor to transmit discovery signaling from the discovery signal generator 230. As well, the PSE 110 can be configured to concurrently use the unused pairs of conductor to transmit control and management serial data 130, Ethernet secondary data 140 and power 150 to the network device 160.

Continuing with the example, the discovery signal generator 230 is advantageously configured to generate a detection signal of fixed frequency and amplitude on the unused pair of conductor to commence the determination of the presence of a remote network device 160 that is capable of receiving DC power 150 via the network. This detection signal may be transmitted to the remote network device 160 via modem 260.

A discovery signal detector 240 is advantageously configured to receive a signal from the remote network device 160 to identify the presence of a network device 160. Further, the discovery signal detector 240 is advantageously configured to coordinate with the power controller 250 to regulate and transfer power to the remote device 160. Once powered, the system is suitably configured with logic to monitor the remote device 160 to concurrently supply power along with data and control signals.

In an embodiment, on the return path of the detection process, the unused-receive pair of conductor is suitably connected to the modem 260 as shown in FIG. 2. The modem 260 is advantageously configured to extract the received serial bit-stream and discovery signaling. Upon determination of the presence of an un-powered network device, the power controller 250 may be enabled. Accordingly, power controller 250 applies power to the unused-transmit pair transmitting DC power 150 to the network device 160 via the Ethernet magnetics 260.

With continued reference to FIG. 2, serial data 130 used to control and mange the network device 160 is suitably transmitted over the unused pairs of conductor. Specifically, the serial data 130 is advantageously transferred to the mux 220 of the PSE 110 via a standard serial communications port or interface of a management device (not shown). For example, an RS-232 or RS-422 interface port is suitably used to communicate the serial data 130 to the PSE 110. Of course, it will be appreciated that any serial port known in the art is suitably used to communicate the serial data 130.

In addition to the transmission of serial data 130, the system is advantageously configured to transmit Ethernet secondary data 140 to control and manage the remote device 160. The micro terminal server 210 on the PSE 110 side of the system is suitably used as another serial bit-stream sink or source in addition to the serial data 130. The micro terminal server 210 may be configured to convert Ethernet secondary 140 traffic from a different LAN or VLAN dedicated to management or control to a serial bit-stream signal.

In other words, the system is advantageously configured to convert the Ethernet secondary 140 communication into a serial bit-stream signal to be modulated on to the downstream connection. It will be appreciated that this process may eliminate the need for a terminal server and may allow connection of an Ethernet based WAN interface adapter (e.g. cable modem or DSL modem) or separate LAN/VLAN for control and management of the PD 160.

It will be appreciated that this Ethernet to serial conversion process enables a network administrator to manage and control the remote device 160 beyond the limited physical range of a serial connection. It will also be appreciated that this disclosure is independent of the protocol used to communicate between a network node (not shown) and the micro terminal server 210 however, it will be appreciated that a protocol such as Telnet could be used to facilitate the communication.

Continuing with the example, the micro terminal server 210 is advantageously configured to receive the Ethernet secondary signals 140 and to convert the Ethernet secondary signals 140 into bit-stream serial data signals. Once converted into serial control data, the signals are suitably transmitted from the micro terminal server 210 to the mux 220. In addition to performing the conversion, it will be appreciated that the micro terminal server 210 is advantageously configured with logic to control the operation of the mux 220.

The mux 220 is suitably configured to merge the serial data signals 130 and serially convert Ethernet secondary signals 140 for transmission to the modem 260 where the signals can be modulated and ultimately transmitted to the remote device 160. It will be appreciated that the mux 220 is suitably configured to transmit serial data 130 and Ethernet secondary data 140 as individual or combined signals.

Next, the serial data signals are transferred to the modem 260 which is advantageously configured to modulate and transmit the signals via the unused pairs of conductor to the Ethernet magnetics 270. Independent of a source device (not shown), the modem 260 modulates the bit-stream serial data via the unused-transmit pair in a fashion interoperable with the signals from the discovery signal generator 230 and power 150. In other words, the modem is advantageously configured to modulate the signals in such a manner to permit the transmission of the serial data and power along a shared medium or conductor.

Of course this disclosure is not limited by the modulation scheme used to transfer the serial bit-stream. It will be appreciated that any modulation scheme known in the art is suitably used without departing from the concepts and embodiments described herein. For example, an artisan will appreciate that a Frequency Shift Keying (FSK) modulation scheme in accordance with the embodiments described herein. In accordance with FSK, the two states of a serial bit-stream (mark and space) are represented by two respective frequencies. In one embodiment, the sum total signaling on the medium is representative of a discovery signal and the two states of the serial bit-stream.

One skilled in the art will appreciate that the PD 160 requires a compatible PSE 110 for this scheme to operate, therefore, the discovery and mark/space signaling can be combined. In this arrangement the discovery signal is suitably set at a fixed frequency ($f_d$) and the mark/space may be set at the same frequency plus an offset above or below (e.g. $f_{mark}=f_d$, $f_{space}=f_d+/-f_{effect}$). The discovery signal is derived from the presence of either the mark or the space signal being received.

Regardless of the modulation scheme employed by the modem, in alternate embodiments, both the PSE 110 and the PD 160 are advantageously configured to use the discovery signal as the base frequency for serial bit-stream encoding and to separate the discovery signal from the serial bit-stream signaling.

Although the components of the PSE 110 circuit block are described in accordance with this embodiment, it will be appreciated that other implementations and arrangements of the components described herein are suitably used without departing from the scope and operation of the present system. For example, the PSE circuit block 110 is advantageously configured to be externally connected to data terminal equipment (DTE) (not shown) and optionally to a network device 160 that is applied to a micro terminal server 210.

Figure 3:
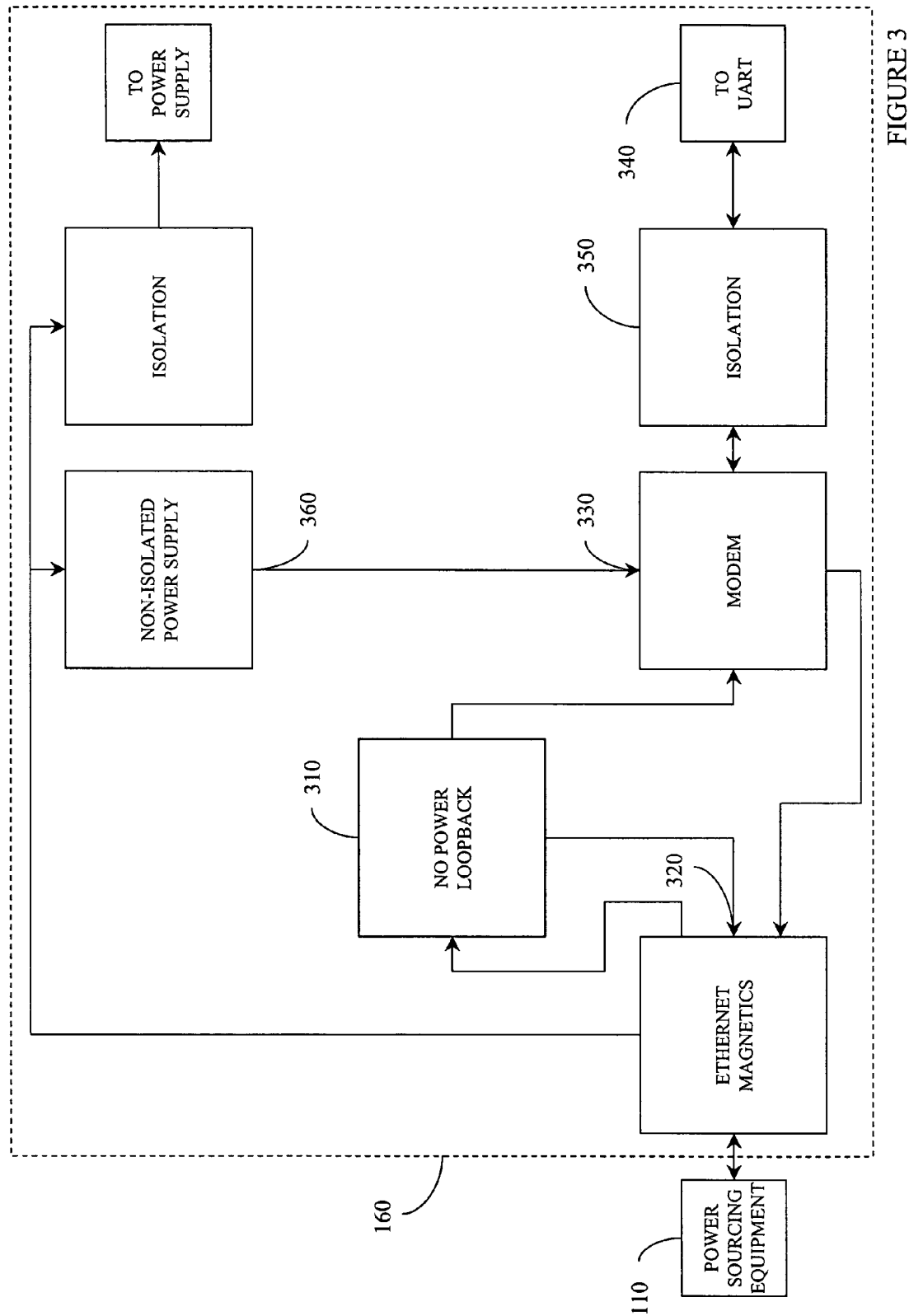
FIG. 3 is a block component diagram of one embodiment of a network powered device (PD) in accordance with the present system illustrating power and data signal flow through the PD.

The signal flow through the PD 160 on the receiving side of the system will be better understood with reference to FIG. 3. Illustrated in FIG. 3 is a simplified system component diagram of one embodiment of the PD 160. The system components shown in FIG. 3 generally represent the PD 160 and may have any desired configuration without departing from the scope of the present system.

In operation, when the PD 160 is in the un-powered state, the discovery signal received from the PSE 110 (as described above) is looped backed via a loop-back signal path 310 between the unused-transmit and the unused-receive pairs and sent to the PSE 110 via Ethernet magnetics 320 to complete the discovery process.

Once received by the PSE 110, DC power is transmitted from the PSE 110 to the PD 160 as described above. It will be appreciated that the modem 330 on the PD 160 side is advantageously configured to loop the discovery signal back to the PSE 110 and to block the received serial bit-stream traffic from being looped back to PSE 110.

Upon receiving power from the PSE 110, the loop-back signal path 310 is disabled and the unused-transmit and unused-receive pairs are connected to the modem 330. The modem 330 converts the modulated transmit and receive bit-streams to logic level signaling that is suitably connected to the Universal Asynchronous Receive Transmit (UART) 340 through the isolation block 350 of the PD 160.

It will be appreciated that the modem 330 is advantageously configured to continue to provide either a new discovery signal or a copy of the original discovery signal to the PSE 110 during the entire time of operation in order to continue the acknowledge the current state of the PD 160.

The modem 330 and supporting circuitry is suitably powered using a dedicated power supply 360 on the non-isolated side of the PD 160. Both the extracted power and UART destined signaling may be bridged to the isolated side of the PD 160 entity. It will be appreciated that the operation of the PD 160 is the same whether power is obtained through the Ethernet connection or through locally applied power. In other words, the serial bit-stream signaling will continue to reach the UART 340 even when the PD 160 is locally powered.

An artisan will appreciate that the operation of the PD discovery scheme is independent of the presence of the serial bit-stream. Similarly the operation of transfer of serial bit-stream is independent of the PD discovery scheme. In other words, the operation of these two functions are completely independent of one another and do not require the other to be operational.

Figure 4:
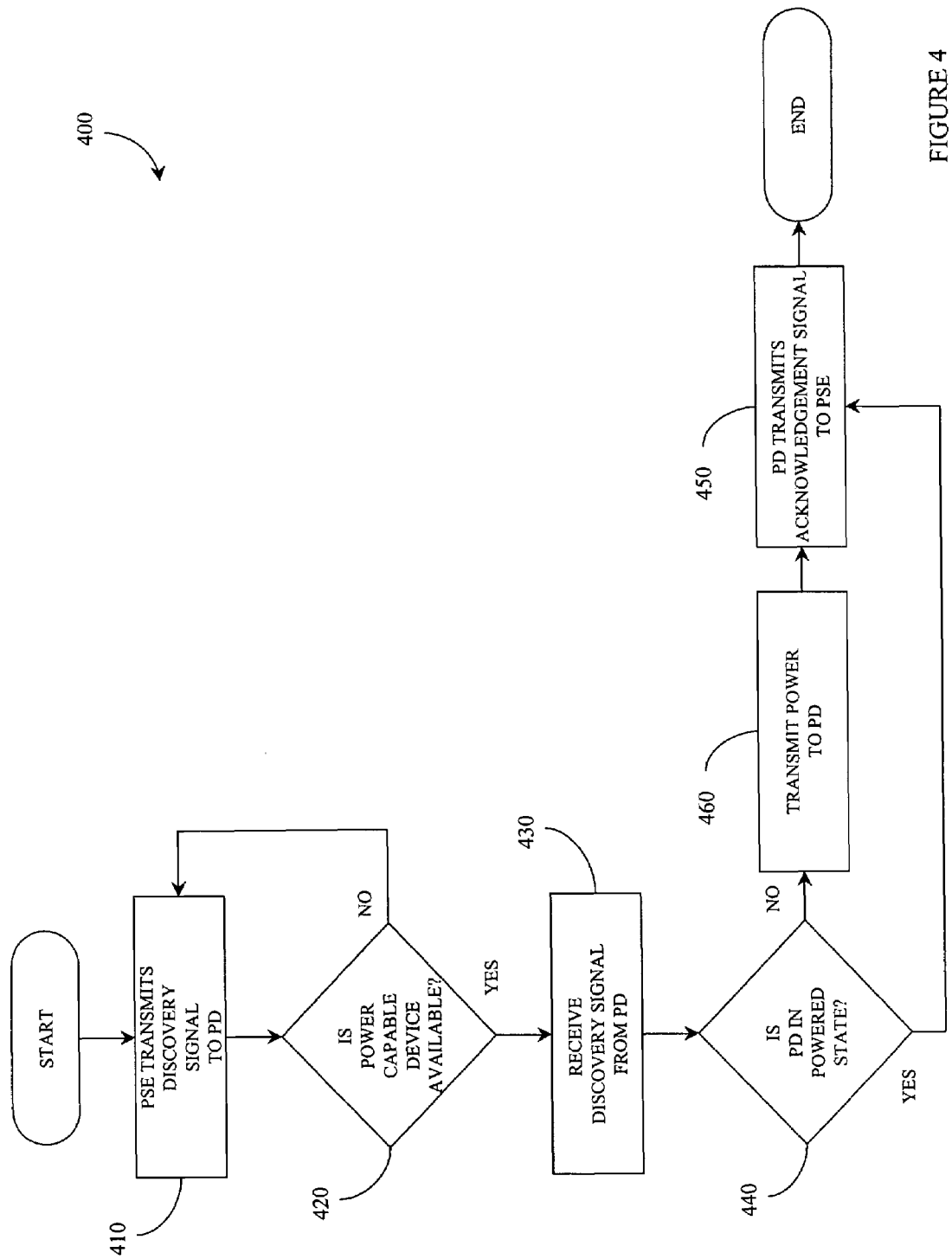
FIG. 4 illustrates one embodiment of the methodology for detecting the presence of a network device in accordance with the present system.
Figure 5:
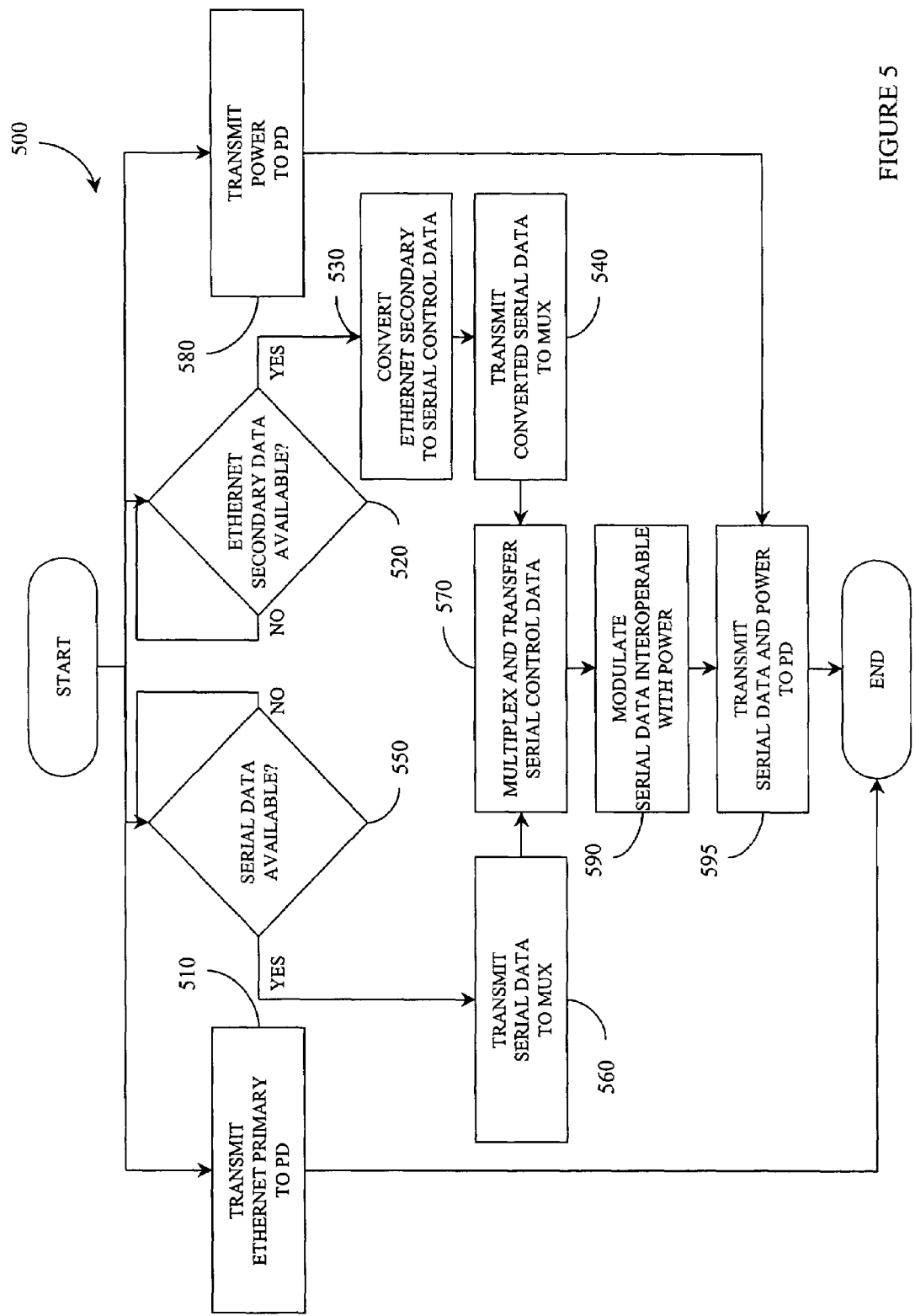
FIG. 5 illustrates one embodiment of the methodology for concurrently transmitting power, data and control signals in accordance with the present system.

Illustrated in FIG. 4 and FIG. 5 are embodiments of a methodology 400, 500 associated with the present system. Generally, FIG. 4 illustrates the discovery process used to determine the presence of a network device capable of receiving power. FIG. 5 generally illustrates the method of transmitting power, data and control signals throughout the present system.

The illustrated elements denote "processing blocks" and represent computer software instructions or groups of instructions that cause a computer or processor to perform an action(s) and/or to make decisions. Alternatively, the processing blocks may represent functions and/or actions performed by functionally equivalent circuits such as a digital signal processor circuit, an application specific integrated circuit (ASIC), or other logic device. The diagram, as well as the other illustrated diagrams, does not depict syntax of any particular programming language. Rather, the diagram illustrates functional information one skilled in the art could use to fabricate circuits, generate computer software, or use a combination of hardware and software to perform the illustrated processing.

It will be appreciated that electronic and software applications involve dynamic and flexible processes such that the illustrated blocks are suitably performed in other sequences different than the one shown and/or blocks are suitably combined or separated into multiple components. They are also implemented using various programming approaches such as machine language, procedural, object oriented and/or artificial intelligence techniques. The foregoing applies to all methodologies described herein.

Suitable software for implementing the various components of the present system and methods using the teachings presented here include programming languages and tools such as Java, Pascal, C#, C++, C, CGI, Perl, SQL, APIs, SDKs, assembly, firmware, microcode, and/or other languages and tools. The components embodied as software include computer readable/executable instructions that cause one or more computers, processors and/or other electronic device to behave in a prescribed manner. Any software, whether an entire system or a component of a system, may be embodied as an article of manufacture and maintained as part of a computer-readable medium as defined previously. Another form of the software may include signals that transmit program code of the software to a recipient over a network or other communication medium. It will be appreciated that components described herein are suitably implemented as separate components or combined together.

With reference to FIG. 4 and FIG. 5, the methodology will be described directed to a system that is advantageously configured with a PSE and PD capable of transmitting and/or receiving signals via a common conductor or shared medium. Specifically, the methodology will be described with reference to a system that can be configured with logic, a discovery signal generator and a discovery signal detector to determine the presence and current state of a powered device. Also, the methodology will be described with reference to a system configured with a micro terminal server to convert Ethernet data to serial bit stream data, a multiplexer to combine signals and a modem to modulate and demodulate signals and a power controller and supply to regulate and provide power to the powered device.

Referring to FIG. 4, the process is commenced with the determination of a PD. Illustrated in FIG. 4 is an embodiment of the process steps that are suitably taken to determine the presence and current state of a PD. At block 410, the system generates and transmits a discovery signal to determine the presence of a PD.

If at decision block 420, a powered device is not available, the system remains idle until a device capable of receiving power via the network is available. If at decision block 420 the system determines the presence of remote device capable of receiving power via the network, the signal transmission continues and is received by the PD (block 430).

Next, the discovery signal is processed to determine the present state of the PD (decision block 440). If the PD is already in the powered state, an acknowledgement signal is suitably transferred to the PSE to continue uninterrupted transmission of power (block 450). If the PD is in an unpowered state, power is transmitted to the PD at block 460. Following the transfer of power at block 460, the system again sends an acknowledgement signal to continue uninterrupted power delivery to the device (block 450).

Referring now to FIG. 5, an embodiment of the process steps that are advantageously taken to concurrently transmit signals from a PSE to a PD are shown. As illustrated in FIG. 5, the process can include multiple simultaneous processes.

At block 510, the system can transmit Ethernet primary signals to the PD. Concurrent with the transmission of Ethernet primary signals, the system is suitably configured to transfer control and power signals to the PD.

Next, the system queries to determine if Ethernet secondary data is available (decision block 520). If Ethernet secondary data is not available at block 520, the system continues to query for Ethernet secondary data while continuing to transmit other available signals.

If at block 520 Ethernet secondary data is available, the system converts the Ethernet secondary data into serial control data (block 530). Once converted into serial control data, the data is transferred to the mux (block 540).

Concurrent with the above processes, the system determines if serial data is available (block 550). If at block 550 serial data is not available, the system continues to query for serial data while continuing to transmit other available signals. If at block 550 serial data is available, the serial data is transferred to the mux (block 560).

At block 570, the mux combines the serial data and serially converted Ethernet secondary data and transfers the signals to a modem. Concurrently, DC power is suitably transmitted by the PSE to the PD (block 580).

The modem modulates the serial control data on a shared medium in a fashion interoperable with the DC power (block 590). Finally, the serial control data and power are transmitted to the PD via a shared medium (block 595).

While the present system has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the system, in its broader aspects, is not limited to the specific details, the representative apparatus, and illustrative examples shown and described. Accordingly, departures may be made from such details without departing from the spirit or scope of the applicant's general inventive concept.

We claim:

1. A method, comprising:
   receiving a power signal from a power input;
   receiving a data signal from a data input;
   receiving an Ethernet primary communication signal;
   sending the Ethernet primary communication signal to a network device on a first medium;
   sending a discovery signal to the network device on a second medium;
   receiving a discovery response from the network device via the second medium that is responsive to the discovery signal;
   receiving an Ethernet secondary data signal;
   converting the Ethernet secondary data signal into a bitstream second data signal;
   multiplexing the data signal and the second data signal for transmission on the second medium; and
   concurrently providing a power signal modulated with a data signal and the second data signal to the network device on the second medium after receiving the discovery response signal.

2. The method as set forth in claim 1 further comprising the step of modulating the data signal in a manner interoperable with the power signal.

3. The method as set forth in claim 1 further comprising the step of receiving an Ethernet secondary data signal.

4. An apparatus comprising:
   a power input for receiving a power signal;
   a primary communication input for receiving an Ethernet primary communication signal;
   a data input for admitting a data signal;
   a modem for modulating the data signal with the power signal;
   a discovery signal generator coupled to the modem;
   a discovery signal detector coupled to the modem;
   wherein the Ethernet primary communication signal is provided to a network device on a first medium;
   wherein the data signal and the power signal are provided to the network device on a second medium;
   wherein the discovery signal generator is configured to send a discovery signal to the network device through the modem on the second medium;
   wherein the discovery signal detector is configured to detect a discovery response signal responsive to the discovery signal via the modem; and
   wherein the discovery signal detector is responsive to detecting a discovery response signal to have the power signal provided to the network device on the second medium.

5. The apparatus set forth in claim 4 wherein the modem employs a frequency shift keying scheme.

6. The apparatus set forth in claim 4 wherein the data is serial control data.

7. The apparatus as set forth in claim 4 further comprising:
   a second communication input for receiving an Ethernet secondary data signal into the apparatus;
   a multiplexer to combine the data signal and secondary data signal for transmission on the second medium; and wherein the modem modulates the secondary data signal with the data signal and the power signal; and wherein the data signal, secondary data signal, and the power signal are concurrently transmitted on the second medium.

8. The apparatus set forth in claim 7 further comprising a micro terminal server to convert the Ethernet secondary data signal to a bit stream.

9. The apparatus of claim 4 wherein the power signal is sourced from a DC power source.

10. The apparatus of claim 4 wherein the data input comprises an RJ-45 jack, wherein the RJ-45 jack connects the data input to a network.

11. The apparatus of claim 10 wherein the RJ-45 jack further includes any necessary transformers for impedance matching, isolation, and noise rejection.

12. The apparatus set forth in claim 4 further including sensing circuits which detect whether the network device connected to the network port requires power.

13. The apparatus of claim 12 wherein the sensing circuits require power and wherein the sensing circuits couple power and data signals and transmit them to the network device on the second medium.

14. The apparatus of claim 12 wherein the sensing circuits detect that the network device does not require power and wherein the sensing circuits allow for passive transmission of data signals only.

15. An apparatus, comprising:
a power input for receiving a power signal;
a primary communication input for receiving an Ethernet primary communication signal;
a data input for admitting a data signal;
a second primary communication input for receiving an Ethernet secondary communication signal;
a first output coupled on a first medium to the network device;
a second output coupled on a second medium to the network device;
means for multiplexing the data signal and the Ethernet secondary communication signal;
means for modulating the multiplexed data signal and Ethernet secondary communication signal with the power signal;
a discovery signal generator;
a discovery signal detector;
wherein the Ethernet primary communication signal is provided to the network device on the first output;
wherein the means for modulating provides the power signal, data signal and Ethernet secondary communication signal on the second output;
wherein the discovery signal generator is responsive to send a discovery signal to the network device through the means for modulating on the second output;
wherein the discovery signal detector is configured to receive a discovery response signal that is responsive to the discovery signal via the means for modulating; and
wherein the means for modulating is responsive to provide the power signal to the network device after receiving the discovery response signal.

* * * * *